Feb. 27, 1951     C. J. SHERMAN     2,543,646
COOKING VESSEL CONTROL UNIT

Filed Nov. 4, 1947

INVENTOR.
CARROLL J. SHERMAN,
BY: Harold B. Good
ATTORNEY.

Patented Feb. 27, 1951

2,543,646

UNITED STATES PATENT OFFICE 2,543,646

COOKING VESSEL CONTROL UNIT

Carroll J. Sherman, Indianapolis, Ind., assignor to The Sherman-Guffey Corporation, Indianapolis, Ind., a corporation of Indiana Application November 4, 1947, Serial No. 783,909

2 Claims. (Cl. 219—43)

The present invention relates to a control unit for cooking vessels, and is particularly concerned with the provision of improved means for automatically controlling the supply of heat to a cooking vessel in response to temperature conditions within the vessel. The primary object of the invention is to provide a simple and inexpensive, yet unusually efficient unit, cooperable with a cooking vessel of predetermined characteristics for controlling the supply of heat thereto. Further objects of the invention will appear as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

Figure 1:
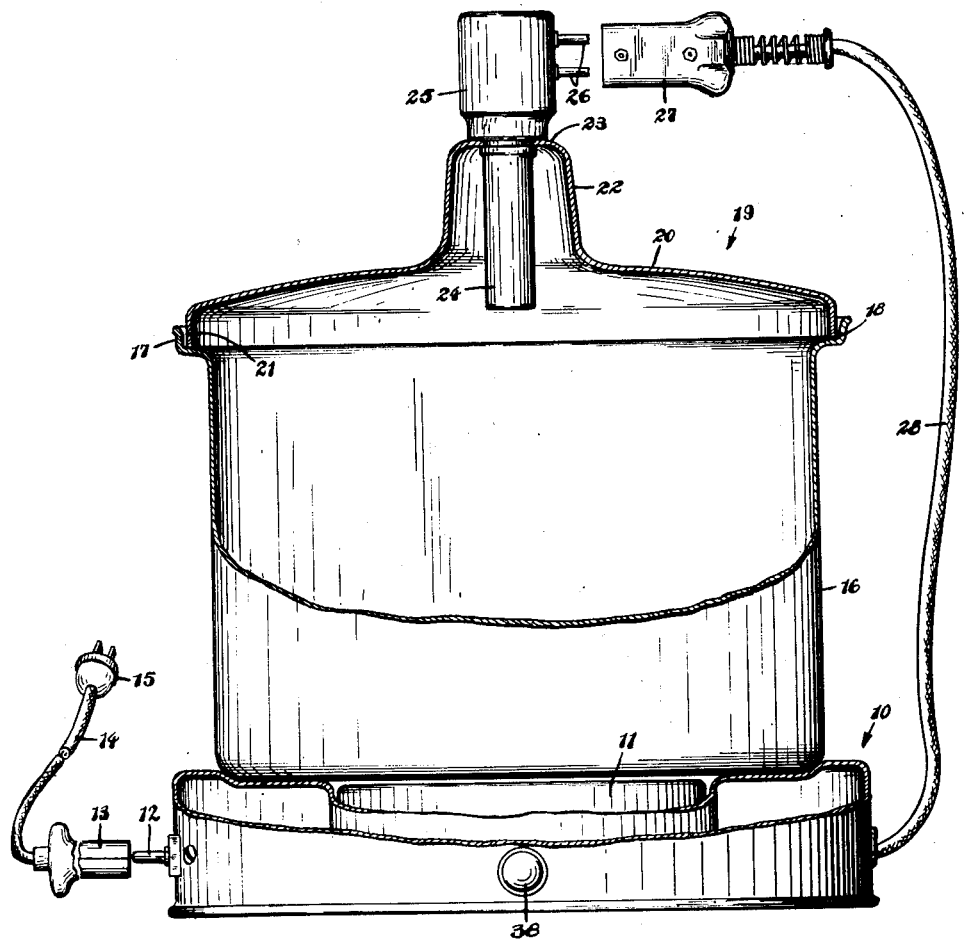
Figure 2:
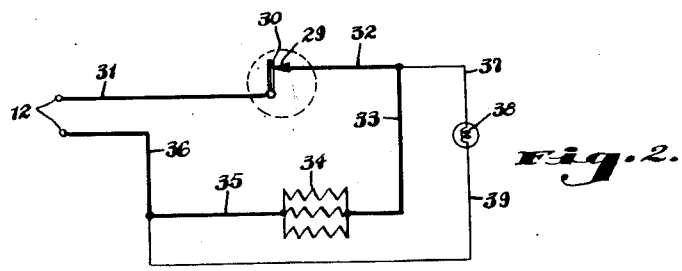

Fig. 1 is a broken elevation of a unit constructed in accordance with my invention and associated with a cooking vessel; and Fig. 2 is a simplified wiring diagram useful in explaining the operation of my invention.

In order that the operation, as well as the construction, of the unit of my invention may be more clearly understood, I have illustrated it in the environment in which it will be used. I have shown an electric stove, indicated generally by the reference numeral 10, and including an electrically energizable heating unit 11 whose terminals are connected electrically to a pair of prongs 12 projecting outwardly from the stove 10 and adapted to cooperate with a standard female plug 13. An electric cord 14 of ordinary construction provides an electrical connection between the unit 13 and a standard prong type plug 15.

I have further illustrated a cooking vessel 16 adapted to stand upon the stove 10 and to be heated by the unit 11. Preferably, the vessel 16 will be provided with a perimetral flange 17 providing an annular socket or condensate-channel 18 with which a suitable cover may cooperate.

In accordance with my invention, the cover, indicated generally by the reference numeral 19, comprises a discoid body 20 having a downturned perimetral flange 21 which may be received in the channel 18 to provide a fluid seal for the vessel 16. Preferably centrally, the body 20 is formed with an outwardly protruding, substantially cylindrical projection 22 defining an inwardly opening inverted well whose base 23 is centrally perforated. The well defined by the protrusion 22 is of substantial axial length for reasons which will appear as the description proceeds.

Positioned largely within the well is a thermo-responsive switch unit indicated by the reference numeral 24. The unit 24 is of known construction, comprising a pair of contacts and thermo-sensitive means associated therewith for controlling the relative position of said contacts, the whole being enclosed in an axially elongated tubular housing. The base 23 of the well is perforated, and I provide means 25 cooperable with the housing of the switch unit 24, through the perforation in said well base, to clamp the thermo-responsive unit in position, as illustrated. The means 25 includes a pair of prongs or terminals 26 respectively electrically connected to the switch contacts of the unit 24. It will be seen that, when the unit 24 is clamped in operative position, it is disposed largely within the well defined by the protrusion 22, and terminates in a level above the level of the edge of the flange 21.

Preferably, the prongs 26 will be substantially different from the prongs 12, either in cross sectional dimensions or in spacing, or in both those respects; and a female fitting 27 is adapted to be electrically associated with said prongs 26, said fitting 27 being connected, by a standard two-wire cord 28, in series with the energizing circuit for the unit 11.

It will be clear, from the above, that the unit 11 can be energized only when the fitting 27 is associated with the prongs 26 and when the thermo-responsive switch unit is in closed condition. As the temperature impressed upon said unit rises, the switch will open to break the energizing circuit for the unit 11.

In Fig. 2, I have indicated, more or less diagrammatically, the contacts 29 and 30 incorporated in the switch unit 24. The contact 30 is connected by wire 31 with one of the terminals 12, while the contact 29 is connected, through wires 32 and 33, with one side of the coils 34 of the unit 11, the other side thereof being connected, by wires 35 and 36, with the other terminal 12. Wires 37 and 39 connect the opposite sides of a pilot light 38 with the wires 32 and 36, respectively, thus establishing an energizing circuit for said pilot light parallel with the energizing circuit for the coils 34.

The general mode of operation of the entire assembly will be clear from the above description.

The broad concept of thus controlling the supply of heat to a cooking vessel through the medium of a thermo-responsive switch disposed within the vessel, is not new; but the specific means for accomplishing that purpose, disclosed and claimed herein, comprises my invention and is accompanied by substantial functional advantages. It is desirable, of course, not only in order to conserve energy, but also in order to maintain a maximum concentration of the nutrient elements of food to be cooked, to minimize the space within a cooking vessel occupied by gases and vapors. Furthermore, the larger the gas-filled space within a cooking vessel, the greater will be the lag between the temperature impressed upon a thermo-responsive element in that gas space and the temperature of the food being cooked. Of course, it is undesirable to project a thermo-responsive element directly into the mass of food being cooked.

Various devices have heretofore been provided for controlling the supply of heat to a cooking vessel through the medium of a thermo-responsive element carried by, and within a cover for such a vessel; but most of them have either provided devices which will be projected into the mass of material being cooked when the cover is applied to the vessel, or devices in which the thermo-responsive element drives mechanical means projecting through the cover. In all arrangements heretofore known to me, either one or the other of these disadvantageous arrangements has been involved, or the cover has been of such character as to enlarge substantially the gas-filled space above the surface of the food being cooked. According to the present invention, the elongated unit 24 is mounted in a well, whose transverse dimensions only slightly exceed the transverse dimensions of the thermo-responsive unit, so that the volume of the vessel above the surface of food being cooked is minimized; and yet the thermo-responsive unit is positioned entirely above that level. The only connections between the switch contacts and the external surface are electrical connections, so that no moving part projects through the cover. As a consequence, the problem of sealing the cover is not complicated by the necessity for sealing a moving joint.

I have found, by actual test, that the structure herein disclosed is substantially more efficient in operation than any device intended for accomplishing a similar function, heretofore known to me.

I claim as new invention:

1. For use with an electrically-energized heater having an energizing circuit, and a cooking vessel adapted to be cooperatively associated with said heater to absorb heat therefrom, a cover for such vessel, a thermo-responsive switch carried by said cover and comprising a pair of normally-closed contacts separable in response to an increase in the temperature impressed thereon and disposed in a tubular housing elongated in the direction of the axis of said cover, said cover being provided with an inverted well receiving said housing, whereby said housing is disposed entirely within the boundaries of said cover, said well having a transverse dimension substantially less than that of said cover and an axial dimension substantially greater than its transverse dimension and being in open communication with the interior of said cover and closed to the surrounding atmosphere, and means for connecting said switch in said heater energizing circuit.

2. In a device of the class described, a discoid cover having an outward projection defining an inwardly-opening inverted well, a thermo-responsive switch unit comprising a pair of contacts, thermo-sensitive means controlling the relative positions of said contacts, and a tubular housing enclosing said contacts and thermo-sensitive means, the base of said well being perforated, means cooperative with said tubular housing through said perforated well base to clamp an end of said housing in place on said well base with said housing disposed largely within said well and said means disposed primarily outside said cover to close the perforation through said base, said means including a pair of terminals respectively electrically connected to said contacts, said cover being downturned at its perimeter, and said housing, when so clamped in place, terminating in a level above the level of the cover perimeter.

CARROLL J. SHERMAN.

REFERENCES CITED

The following references are of record in the file of this patent:

UNITED STATES PATENTS

| Number | Name | Date |
|---|---|---|
| 1,513,927 | Oakes | Nov. 4, 1924 |
| 1,702,480 | Newsom | Feb. 19, 1929 |
| 1,720,294 | Sanders | July 9, 1929 |
| 2,222,124 | Sherman | Nov. 19, 1940 |